United States Patent [19] [11] 4,232,117
Naoi et al. [45] Nov. 4, 1980

[54] PHOTOGRAPHIC LIGHT-SENSITIVE MATERIALS HAVING IMPROVED FILM PHYSICAL PROPERTIES

[75] Inventors: Takashi Naoi; Ikutard Horie, both of Minami-ashigara, Japan

[73] Assignee: Fuji Photo Film Co., Ltd., Minami-ashigara, Japan

[21] Appl. No.: 877,524

[22] Filed: Feb. 13, 1978

[30] Foreign Application Priority Data

Feb. 14, 1977 [JP] Japan ................................ 52-14817

[51] Int. Cl.$^2$ ................................ G02C 1/78
[52] U.S. Cl. ................................ 430/539; 430/523; 430/950; 430/954
[58] Field of Search ................ 96/67, 87 R; 430/523, 430/950, 954

[56] References Cited

U.S. PATENT DOCUMENTS

| | | | |
|---|---|---|---|
| T873,009 | 4/1970 | Campbell | 96/85 |
| 3,518,087 | 6/1970 | Yackel et al. | 96/84 R |
| 3,533,795 | 10/1970 | Blaumueller | 96/87 R |
| 3,547,644 | 12/1970 | Moede et al. | 96/87 R |
| 3,589,905 | 6/1971 | Reedy et al. | 96/87 R |
| 3,644,119 | 2/1972 | Jones | 96/84 R |
| 3,674,531 | 7/1972 | Shephard et al. | 96/87 R |
| 3,788,856 | 1/1974 | Paesschen et al. | 96/87 R |

*Primary Examiner*—Jack P. Brammer
*Attorney, Agent, or Firm*—Sughrue, Rothwell, Mion, Zinn and Macpeak

[57] ABSTRACT

A silver halide photographic light-sensitive material having two or more hydrophilic colloid layers on at least one side of a support, wherein (i) a hydrophilic colloid layer positioned farther from the support contains gelatin, a matting agent having an average particle size of 1 to 5$\mu$ and colloidal silica and (ii) a hydrophilic colloid layer which is positioned nearer the support than the position of hydrophilic colloid layer (i) contains gelatin and a polymer latex.

17 Claims, No Drawings

PHOTOGRAPHIC LIGHT-SENSITIVE MATERIALS HAVING IMPROVED FILM PHYSICAL PROPERTIES

BACKGROUND OF THE INVENTION

1. Field of the Invention

The present invention relates to silver halide photographic light-sensitive materials having improved film physical properties and, particularly, to silver halide photographic light-sensitive materials having excellent dimensional stability, good antiadhesive properties and good transparency after development.

2. Description of the Prior Art

Silver halide photographic materials generally include a layer which contains a hydrophilic colloid such as gelatin as a binder on at least one side of a support. Such a hydrophilic colloid layer has a defect that it easily expands and contracts in response to changes in humidity or temperature.

The dimensional change of the photographic light-sensitive materials resulting from the expansion and the contraction of the hydrophilic colloid layers is a very serious defect in photographic light-sensitive materials for printing.

In order to obtain photographic light-sensitive materials having a small dimensional change, namely, an excellent dimensional stability, a technique of rendering the binder flexible is known.

An example of such a technique is a process which comprises incorporating a polymer latex in a binder e.g., as described in Japanese Patent Publications 4272/64, 17702/64, 13482/68 and 5331/70 and U.S. Pat. Nos. 2,376,005, 2,763,625, 2,772,166, 2,852,386, 2,853,457, 3,397,988, 3,411,911 and 3,411,192.

In a hydrophilic colloid layer comprising a binder containing a polymer latex, however, the adhesiveness or tackiness increases at high humidity and, particularly, under an atmosphere of a high temperature and a high humidity, and the layer easily adheres to other articles when contacted with them.

This phenomenon of adhesion occurs during production of photographic light-sensitive materials, during processing thereof or during storage thereof between the photographic light-sensitive materials themselves or between the photographic light-sensitive material and another article coming in contact with it, with various disadvantages sometimes occurring.

In order to decrease the adhesion of the hydrophilic colloid layers (hereinafter, the term "antiadhesive property" will be used to describe this in accordance with the terminology generally employed in the art), a technique is known which comprises adding finely divided particles having an average particle size of 1 to 5μ, for example, finely-divided particles of silica, magnesium oxide or polymethyl methacrylate, to increase the roughness of a surface of the colloid layer. This technique is generally called matting in the art.

However, there is a disadvantage in matting in that, if a matting agent is present in an amount sufficient to obtain sufficient antiadhesive property, undesirable effects occur when the photographic light-sensitive materials are developed, for example, the transparency of the images formed decreases, the granularity of the images is degraded and the lubricating property of the surface of the photographic light-sensitive materials deteriorates and the material is easily scratched.

SUMMARY OF THE INVENTION

Accordingly, a first object of the present invention is to provide silver halide photographic light-sensitive materials having excellent dimensional stability and excellent antiadhesive property.

A second object of the present invention is to provide silver halide photographic light-sensitive materials having excellent dimensional stability, excellent antiadhesive property and good transparency after development.

A third object of this invention is to provide a process for improving the transparency of silver halide photographic light-sensitive materials after development and for improving further the dimensional stability and the antiadhesive property of silver halide photographic light-sensitive materials.

These objects of the present invention are attained with a silver halide photographic light-sensitive material having two or more hydrophilic colloid layers on at least one side of a support wherein (i) a hydrophilic colloid layer positioned farther from the support (hereinafter, referred to as the "top layer") contains gelatin, a matting agent having an average particle size of 1 to 5μ and colloidal silica and (ii) a hydrophilic colloid layer positioned nearer the support than the position of the hydrophilic colloid layer (i) contains gelatin and a polymer latex.

DETAILED DESCRIPTION OF THE INVENTION

The present invention is characterized by a combination of a hydrophilic colloid top layer containing gelatin, a matting agent and colloidal silica and a hydrophilic colloid layer containing gelatin and a polymer latex on at least one side of the support. Such a combination may be present on only one side of the support or the combination may be present on both sides of the support.

For example, in photosensitive materials having at least one silver halide emulsion layer and a surface protective layer on one side of the support and a non-light-sensitive colloid layer (hereinafter, referred to as a "back layer," because the non-light-sensitive colloid layer on the side of the support opposite that of the surface on which the light-sensitive emulsion layer is coated is called a "back layer") on the other side of the support, the following three embodiments can be employed.

(1) The matting agent and the colloidal silica are present in the surface protective layer of the light-sensitive emulsion side and the polymer latex is present in at least one silver halide emulsion layer.

(2) Two or more back layers are applied to the support, wherein the matting agent and the colloidal silica are present in the layer positioned farther from the support (hereinafter, referred to as "back upper layer") and the polymer latex is present in the layer nearer the support (hereinafter referred to as "back lower layer").

(3) The matting agent and the colloidal silica are present in the emulsion surface protective layer and the back upper layer, and the polymer latex is present in the silver halide emulsion layer and the back lower layer. Although the present invention includes any of the three embodiments described above, embodiments (2) and (3) are particularly preferred.

The top layer used in the present invention means a surface protective layer where such is present on the photosensitive emulsion layer side or means a back upper layer where such is present on the back layer side. In the present invention, it is preferred for the back layer to have a thickness of about 1 to about 10μ, and particularly 3 to 6μ.

Where the back layer comprises two or more hydrophilic colloid layers, the back upper layer preferably has a thickness of about 0.1 to about 3μ and particularly 0.5 to 2μ.

Further, the back layer can comprise two or more hydrophilic colloid layers but it is particularly preferred for the back layer to be composed of two layers.

Gelatin is used as a hydrophilic colloid employed as a binder in the present invention. Any gelatin materials generally employed in this field, such as the so-called lime-treated gelatin, acid-treated gelatin, and enzyme-treated gelatin, etc. can be used as the gelatin but acid-treated gelatin can be particularly advantageously used in this invention.

In addition to the gelatin, the hydrophilic colloid layers may additionally contain proteins such as colloidal albumin or casein, etc., cellulose compounds such as carboxymethylcellulose, or hydroxyethylcellulose, etc., saccharide derivatives such as agar, sodium alginate or starch derivatives, etc., gelatin derivatives, graft gelatin, or modified gelatin and synthetic hydrophilic colloids such as polyvinyl alcohol, poly-N-vinylpyrrolidone, polyacrylic acid copolymers, polyacrylamide or derivatives thereof and partially hydrolyzed products, thereof, etc. as hydrophilic colloids. If desired, a mixture of two or more of these additional hydrophilic colloids may be used.

A suitable amount of gelatin in the hydrophilic colloid top layer is about 0.1 to about 3 $g/m^2$ and preferably 0.3 to 1.5 $g/m^2$ and a suitable amount of gelatin in the hydrophilic colloid layers other than the top layer is about 1 to about 7 $g/m^2$ and preferably 2 to 4 $g/m^2$. The other additional hydrophilic colloids described above can be present in the hydrophilic colloid layers in an amount of up to about 30% by weight based on the amount of gelatin present.

The matting agent used in the present invention is a finely-divided inorganic or organic powder having an average particle size of about 1 to about 5μ, preferably 3 to 4μ. Inorganic matting agents which can be used include silica (silicon dioxide), magnesium oxide, titanium oxide and calcium carbonate, etc. Organic matting agents include polymethyl methacrylate, cellulose acetate propionate and polystyrene, etc. However, silica and, particularly, polymethyl methacrylate are preferably used as the matting agent. It is preferred for the index of refraction of the matting agent to approximate that of gelatin. An example of a matting agent having an index of refraction approximately that of gelatin is polymethylmethacrylate.

The amount of the matting agent added to the back upper layer and/or the surface protective layers is about 0.1 to about 5% and preferably 0.2 to 2%, based on the dry weight of the gelatin forming the whole back layer or the surface protective layer.

According to the present invention, where a plurality of back layers as described above is present, the transparency after processing is markedly improved as compared to light-sensitive materials with a single back layer having the same thickness, when the amount of the matting agent in all of the back layers is the same as that of the matting agent where only one back layer is present, and the anti-adhesive property is also improved because all of the matting agent is added to the back upper layer.

In the present invention, the colloidal silica to be added to the back upper layer and/or the surface protective layer shows an effect of remarkably improving the antiadhesive property.

Particularly, if the colloidal silica is added to the back upper layer, the antiadhesive property is remarkably improved. Therefore, it is quite preferred to add the colloidal silica to the back upper layer, because the amount of the matting agent can be reduced depending on the improvement of the antiadhesive property (for example, 0.5 to 1.5% by weight or so based on the dry weight of gelatin in all of the back layers), and thus the transparency after processing is improved because of the reduction in the amount of the matting agent present.

The colloidal silica used in the present invention has an average particle size of 7 mμ to 120 mμ and may contain silicon dioxide as a major component (e.g., in an amount of about 98% by weight or more of the total solids present) and alumina or sodium aluminate as a minor component (e.g., in an amount of about 2% by weight or less of the total solids present). Further, the colloidal silica may contain (e.g., in an amount of about 0.05 to 2.0% by weight based on the $SiO_2$), as a stabilizer, an inorganic base such as sodium hydroxide, potassium hydroxide, lithium hydroxide or ammonium hydroxide or an organic salt such as a tetramethylammonium salt, etc. Particularly, potassium hydroxide or ammonium hydroxide is preferred as the stabilizer for the colloidal silica.

Colloidal silica is described in detail in for example, *Surface and Colloid Science,* Volume 6, pages 3–100, edited by Egon Matijevic, John Wiley & Sons (1973).

Examples of the colloidal silicas which can be used include those commercially available under the name: Ludox AM, Ludox AS, Ludox LS, Ludox TM and Ludox HS from E. I. du Pont de Nemours & Co. (U.S.A.); those commercially available under the name: Snowtex 20, Snowtex C, Snowtex N and Snowtex O from Nissan Chemicals Ind. Ltd., those commercially available under the name: Syton C-30 and Syton 200 from Monsanto Co. (U.S.A.) and those commercially available under the name: Nalcoag 1030, Nalcoag 1060 and Nalcoag ID-21-64 from Nalco Chem. Co. (U.S.A.).

A preferred ratio of the colloidal silica used in the present invention is about 0.05:1 to about 1.0:1 and, particularly, 0.2:1 to 0.7:1 by weight based on the dry weight of the gelatin used as the binder in the layer.

The polymer latex used in the present invention is very suitable, because it improves the dimensional stability.

It is known generally that when a polymer latex is incorporated in gelatin containing layers such as a back layer, the antiadhesive property deteriorates, although the dimensional stability is improved.

However, according to the present invention, it is now possible to achieve dimensional stability without a deterioration of the antiadhesive property by adding the polymer latex to the back lower layer and/or the silver halide emulsion layer and adding the matting agent and the colloidal silica to the back upper layer and/or the surface protective layer.

The polymer latex used in the present invention is an aqueous dispersion of a water-insoluble polymer having an average particle size of about 20 mμ to about 200 mμ. A preferred amount used is 0.01 to 1.0 and particularly 0.1 to 0.8 based on the dry weight of the gelatin used.

Examples of preferred polymer latexes which can be used in the present invention include polymers having an average molecular weight of above about 100,000 and preferably 300,000 to 500,000, where the alkyl esters, hydroxyalkyl esters or glycidyl esters of acrylic acid; or the alkyl esters, hydroxyalkyl esters or glycidyl esters of methacrylic acid; are the monomer units. Examples of these polymers are represented by the following formulas.

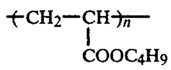
Polymer (1)

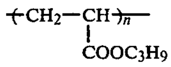
Polymer (2)

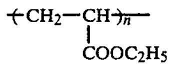
Polymer (3)

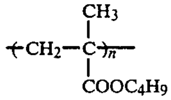
Polymer (4)

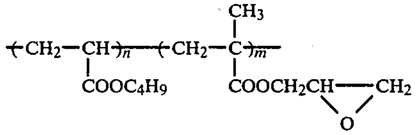
Polymer (5)

n : m = 5 : 5

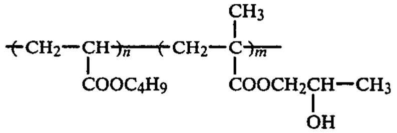
Polymer (6)

n : m = 9 : 1

Further, the polymer latexes are described in detail in Japanese Patent Publication 5331/70 and U.S. Pat. Nos. 2,852,386, 3,062,674, 3,411,911 and 3,411,912 described above.

In the present invention, it is possible to incorporate an agent for increasing the viscosity of gelatin containing solutions, a so-called viscosity increasing agent, in the hydrophilic colloid layers and, particularly, in the back upper layer and the surface protective layer.

Polymers having a repeating unit represented by the following general formula

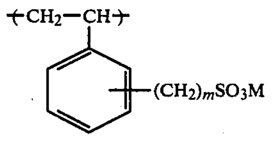

wherein m represents 0, 1 or 2 and M represents an alkali metal atom (e.g., a sodium atom, a potassium atom, etc.) or an ammonium group; are advantageously used as the viscosity increasing agent. A suitable molecular weight range for the viscosity increasing agents is about 5,000 to about 1,000,000, preferably 20,000 to 200,000.

Although homopolymers and copolymers may be used if they have the above described repeating unit therein (e.g., in an amount of 5 mole % or more, preferably 50 mole % or more), homopolymers of the following formulas

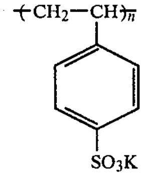

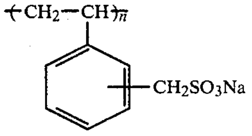

are particularly preferred as the viscosity increasing agent used in the present invention.

A suitable amount of the viscosity increasing agent is about 5% by weight or less and preferably 1 to 3% by weight based on the dry weight of gelatin in the coating solution.

Organic or inorganic hardening agents for gelatin, which may be used individually or as a combination thereof, can be added to the hydrophilic colloid layers in the present invention. Suitable examples of hardening agents for gelatin include the hardening agents described in, for example, C. E. K. Mees and T. H. James *The Theory of the Photographic Process,* 3rd Ed. Macmillan (1966), U.S. Pat. Nos. 3,316,095, 3,232,764, 3,288,775, 2,732,303, 3,635,718, 3,232,763, 2,732,316, 2,586,168, 3,103,437, 3,017,280, 2,983,611, 2,725,294, 2,725,295, 3,100,704, 3,091,537, 3,321,313, 3,543,292 and 3,125,499 and British Pat. Nos. 994,869 and 1,167,207. Typical examples of hardening agents which can be used include aldehyde type compounds and derivatives thereof such as mucochloric acid, mucobromic acid, mucophenoxychloric acid, mucophenoxybromic acid, formaldehyde, dimethylol urea, trimethylol melamine, glyoxal, monomethyl glyoxal, 2,3-dihydroxy-5-methyl-1,4-dioxane, 2,3-dihydroxy-5-methyl-1,4-dioxane, succinaldehyde or glutaraldehyde; active vinyl compounds such as divinyl sulfone, N,N'-ethylene-bis-(vinylsulfonylacetamido)-1,3-bis-(vinylsulfonyl)-2-propanol, methylenebis-maleimide, 5-acetyl-1,3-diacryloylhexahydro-s-triazine, 1,3,5-triacryloyl-hexahydro-s-triazine or 1,3,5-trivinylsulfonyl-hexahydro-s-triazine; active halogen compounds such as 2,4-dichloro-6-hydroxy-s-triazine sodium salt, 2,4-dichloro-6-methoxy-s-triazine, 2,4-dichloro-6-(4-sulfoanilino)-s-triazine sodium salt, 2,4-dichloro-6-(2-sulfoethylamino)-s-triazine or N,N'-bis(-2-chloroethylcarbamoyl)piperazine; epoxy compounds such as bis-(2,3-epoxypropyl)methylpropylammonium p-toluenesulfonate, 1,4-bis-(2',3'-epoxypropyloxy)butane or 1,3,5-triglycidyl isocyanurate or 1,3-diglycidyl-5-($\gamma$-acetoxy-$\beta$-oxypropyl)isocyanurate; ethyleneimino compounds such as 2,4,6-triethylene-s-triazine, 1,6-hexamethylene-N,N'-bis-ethylene urea or bis-$\beta$-ethyleneiminoethyl thioether; methanesulfonic acid ester compounds such as 1,2-di-(methanesulfonoxy)ethane, 1,4-di-(methanesulfonoxy)butane or 1,5-di-(methanesulfonoxy)pentane; carbodiimide compounds such as dicyclohexylcarbodiimide, 1-cyclohexyl-3-(3-trimethylaminopropyl)carbodiimide-p-toluenesulfonate or 1-ethyl-3-(3-dimethylaminopropyl)carbodiimide hydrochloride; isoxazole compounds such as 2,5-dimethyl isoxazole perchlorate, 2-ethyl-5-phenyl isoxazole-3'-sulfonate or 5,5'-(p-phenylene)bisisoxazole, inorganic compounds such as chromium alum or chromium acetate; dehydration-condensation type peptide agents such as N-carboethoxy-2-isopropoxy-1,2-dihydroquinoline or N-(1-morpholinocarboxy)-4-methylpyridinium chloride; active ester compounds such as N,N'-adipoyldioxydisuccinimide or N,N'-terephthaloyldioxydisuccinimide and isocyanates such as toluene-2,4-diisocyanate or 1,6-hexamethylene diisocyanate.

Surface active agents may be incorporated individually or as a mixture thereof in the hydrophilic colloid layers of the present invention. They are generally used as coating aids, but they may be utilized for other purposes such as for emulsifying, for improvement of photograhic properties such as sensitization, etc. or for minimizing the generation of static charges.

Examples of suitable surface active agents include natural surface active agents such as saponin; nonionic surface active agents such as alkylene oxide type, glycerin type or glycidol type agents; cationic surface active agents such as higher alkylamines, quaternary ammonium salts, pyridine and other heterocyclic compounds, phosphonium or sulfonium compounds; anionic surface active agents containing acid groups such as a carboxylic acid, sulfonic acid, phosphoric acid, sulfuric acid ester or phosphoric acid ester group; and amphoteric surface active agents such as amino-acids, aminosulfonic acids or sulfuric or phosphoric acid esters of aminoalcohols.

Some of these surface active agents capable of being used in the present invention are described in U.S. Pat. Nos. 2,271,623, 2,240,472, 2,288,226, 2,739,891, 3,069,101, 3,158,484, 3,201,253, 3,210,191, 3,294,540, 3,415,649, 3,441,413, 3,442,654, 3,475,174, 3,545,974, 3,666,478 and 3,507,660, British Pat. No. 1,198,450 as well as in Ryohei Oda et al, *Kaimenkasseizai no Gosei to sono Oyo,* published by Maki Shoten, (1964), A. W. Schwartz, *Surface Active Agents,* Interscience Publications Incorporated, (1958) and J. P. Sisley, *Encyclopedia of Surface Active Agents,* Vol. 2, Chemical Publishing Company (1964).

Suitable supports for the photographic light-sensitive materials according to the present invention include, for example, cellulose nitrate films, cellulose acetate films, cellulose acetate butyrate films, cellulose acetate propionate films, polystyrene films, polyethylene terephthalate films, polycarbonate films and laminates thereof. When the adhesive strength between the support and the photographic emulsion layer is not sufficient, a layer which is adhesive to both the support and the photographic emulsion layer is usually used as a subbing layer. In order to further improve the adhesive property, the surface of the support may be subjected to a conventional preliminary processing such as a corona discharging treatment, an ultraviolet light treatment or a flame treatment, etc.

The photographic light-sensitive materials of the present invention comprise a support having at least one silver halide emulsion layer on the support. The silver halide emulsion layers may contain physical property improving agents or viscosity increasing agents, such as photosensitive silver halide, chemical sensitizing agents, spectral sensitizing agents, antifogging agents, hydrophilic colloids (particularly, gelatin), gelatin hardening agents, surface active agents, polymer latexes or wetting agents, etc. These agents are described above concerning suitable additives for the hydrophilic colloid layers and also are described in *Product Licensing Index,* Vol. 92, 9232 (Dec. 1971) and Japanese Patent Applications 24783/76, 31539/76, 38559/71, 76741/76 and 102266/76.

The surface protective layer is a layer composed of a hydrophilic colloid, including gelatin, as a binder having a thickness of about 0.3 to about 3$\mu$ and particularly 0.5 to 1.5$\mu$. The surface protective layer can contain a matting agent such as finely-divided particles of polymethyl methacrylate, colloidal silica and, if necessary, a viscosity increasing agent such as potassium polystyrenesulfonate, a gelatin hardening agent, a surface active agent, a lubricating agent or an U.V. light absorbing agent, etc.

The process of the present invention can be applied to various kinds of photographic materials containing hydrophilic colloid layers. For example, the present invention can be utilized for photographic materials in which silver halide is used as a photosensitive component, such as photosensitive materials for printing, X-ray sensitive materials, conventional negative type light-sensitive materials, conventional reversal type light-sensitive materials, conventional positive type light-sensitive materials or direct positive type light-sensitive materials, etc. The effect of the present invention is particularly remarkable when it is used for light-sensitive materials for printing.

There are no limitations on the method of exposing the light-sensitive materials of the present invention to light or on the method of development thereof. For example, descriptions of suitable exposure and development methods which can be used are disclosed in Japanese Patent Applications 24783/76, 31539/76 and 38559/76 and in *Product Licensing Index,* supra.

More specifically, the light-sensitive materials of the present invention can be exposed to obtain photographic images in a conventional manner. Light from various known light sources, such as natural light (sunlight), a tungsten lamp, a fluorescent lamp, a mercury lamp, a xenon arc lamp, a carbon arc lamp, a xenon flash lamp, a cathode ray tube display flying spot and so on can be employed as a light source. Exposure times commonly used when photographic pictures are taken with a camera ranging from 1/1,000 sec. to 1 sec. and exposure times shorter than 1/1,000 sec., for example $1/10^4$ to $1/10^6$ second exposure using a xenon flash lamp or a cathode ray tube display, and an exposure time longer than 1 sec. can be used for the photographic materials of the present invention. A color filter which selectively absorbs lights of certain wavelengths can be optionally employed for controlling the spectral distribution of the light source used. Moreover, the photographic light-sensitive materials of the present invention may be exposed to laser rays, or rays emitted from various kinds of fluorescent materials which are excited by irradiation of electron beams, X-rays, $\gamma$-rays, $\alpha$-rays or the like.

The photographic materials of this invention can be processed using known methods. In this case, known processing solutions can be used. The processing temperature is usually from about 18° C. to about 50° C. but may be lower than about 18° C. or higher than about 50° C. if necessary.

This invention is useful for image formation using a development process (black and white photographic process) for forming silver images. Further, the invention can also be applied to a color photographic process using a development process in which dye images are formed. The developers used for black-and-white photographic processing can contain known developing agents. For example, aminophenols (such as N-methyl-p-aminophenol), 3-pyrazolidones (such as 1-phenyl-3-pyrazolidone), 1-phenyl-3-pyrazolines, dihydroxybenzenes (such as hydroquinone) and ascorbic acid, etc. or combinations thereof can be used as a developing agent.

Moreover, the developers usually contain a known antioxidant, an alkali agent, a pH buffer, an antifogging agent or the like and, if desired, a dissolving aid, a color toning agent, a development accelerator, a surface active agent, an antifoaming agent, a water softener, a hardener, a tackifier, etc., may be present.

So-called "lith-type" development processing can be applied to the photographic materials of this invention. In "lith-type" development processing, dihydroxybenzenes are usually used as a developing agent and the development process is carried out infectiously with a low concentration of sulfite ion for photographic reproduction of line images and half-tone dot images. "Lith-type" development processing is described in detail in L.F.A. Mason, *Photographic Processing Chemistry,* pages 163 to 165, The Focal Press, (1966).

Fixing solutions having a composition generally employed in the art can be used in the present invention. Not only thiosulfates and thiocyanates but also organic sulfur compounds known as fixing agents can be used as fixing agents in the present invention. The fixing solutions may contain a water-soluble aluminum salt as a hardener, if desired.

The present invention will be illustrated in greater detail by reference to the following examples. However, the present invention is not to be construed as being limited to the following examples. Unless otherwise indicated all parts, percents, ratios and the like are by weight.

The properties, i.e., (a) the transparency of the light-sensitive materials after processing, (b) the antiadhesive property of the light-sensitive materials and (c) the dimensional stability in the examples were evaluated in the following manner.

(a) Evaluation of Transparency:

An unexposed sample was developed at 27° C. for 1 minute and 45 seconds using a Fuji Litho Developer LD-322 (produced by Fuji Photo Film Co., Ltd.) by means of a FG-24 Pakorol automatic developing apparatus (produced by Fuji Photo Film Co., Ltd.). After the material was fixed, washed with water and dried, the transparency was measured. The measurement of the transparency was carried out using an ANA-147 type haze meter produced by Tokyo Koden Co.

$$\text{Haze (\%)} = \frac{\text{(Amount of Scattered Light)}}{\text{(Amount of Transmitted Light)}} \cdot 100$$

The haze value means that, the lower the value is, the better the transparency is.

(b) Evaluation of Antiadhesive Property:

Each sample was cut in a size of 4 cm×4 cm to produce two sheets as one set. After conditioning at 35° C. and 75% RH (relative humidity) for 24 hours, the back layer of one sample was brought into contact with the protective layer of the other sample in the same set and the set was allowed to stand at 35° C. and 75% RH for 24 hours while under a load of 1 kg. Then the load was removed and the back layer and the protective layer were separated by stripping. The area of adhesion (area on the protective layer colored by dyes transferred from the back layer) was measured.

Evaluation of the antiadhesive property was carried out according to the following grades.

| | | |
|---|---|---|
| A | Area of adhesion was | 0-25% |
| B | " | 25-50% |
| C | " | 51-75% |
| D | " | 76% or more, or it was impossible to separate the samples because of firm adhesion. |

(c) Dimensional Stability:

The elongation (x: positive number) of a sample having a length of 20 cm at 25° C. and 50% RH when the sample was conditioned at 25° C. and 65% RH and the contraction (y: positive number) of the sample when the conditions were changed from 25° C. and 50% RH to 25° C. and 30% RH were measured. Then, the dimensional stability=x+y was calculated. The lower is the value x+y, the better the dimensional stability is.

EXAMPLE 1

To a surface of a polyethylene terephthalate film (thickness: 100μ) having a subbing layer thereon, a silver halide emulsion having the following Composition (1) was applied so as to form a layer having a dry thickness of 6.0μ and a silver content of 5.0 g/m². Further, on the resulting silver halide emulsion layer, a protective layer having the following Composition (2) was coated according to the combination shown in Table 1 below. On the reverse side of the support, a gelatin back layer having the following Composition (3) was applied according to the combination shown in Table 2 so as to form a layer having a dry thickness of 5μ to obtain Samples (1) to (3).

Composition (1) Composition of Silver Halide Emulsion Layer.

Gelatin 5 g/m²

Silver iodobromochloride (Cl: 80% by mol, Br: 19.5% by mol, and I: 0.5% by mol)

Chloroauric acid 0.1 mg/m²

Polyethyl acrylate latex (The same as that described in Example 3 of U.S. Pat. No. 3,525,620) 1.5 g/m²

Sensitizing Dye: 3-Allyl-5-[2-(1-ethyl)-4-methyl-2-tetrazoline-4-ylidene-ethylidene]rhodanine 6 mg/m²

Antifogging Agent:

4-Hydroxy-6-methyl-1,3,3a-7-tetrazaindene 30 mg/m²

Polyoxyethylene Compound:

$[HO(CH_2CH_2O)_{10}((CH_2)_4O)_{14}(CH_2CH_2O)_{10}H]$ 20 mg/m²

Gelatin Hardening Agent:

2-Hydroxy-4,6-dichloro-s-triazine-sodium salt 60 mg/m²

Surface Active Agent:

Sodium p-dodecylbenzenesulfonate 40 mg/m²

Viscosity Increasing Agent:

Potassium polystyrene sulfonate 100 mg/m²

Composition (2) Composition of Protective Layer

Gelatin: 1 g/m²

Matting Agent:

Polymethyl methacrylate having an average particle size of 3.0-4.0μ 0.05 g/m²

Viscosity Increasing Agent:

Potassium polystyrene sulfonate (limiting viscosity: 2.0) 0.02 g/m²

Surface Activity Agent:

Sodium p-dodecylbenzenesulfonate 0.03 g/m²

Gelatin Hardening Agent:

2-Hydroxy-4,6-dichloro-s-triazine sodium salt 0.01 g/m²

Colloidal Silica:

Snowtex-O, the pH of which was adjusted to 9.5 using potassium hydroxide.

The amount is shown in Table 1 below.

TABLE 1

| Composition of Protective Layer | Sample (1) (control) | Sample (2) | Sample (3) |
|---|---|---|---|
| Colloidal Silica | — | 24 g/100 g of gelatin | |
| Gelatin<br>Matting Agent<br>Viscosity Increasing Agent<br>Surface Active Agent<br>Gelatin Hardening Agent | The same as Composition (2) | | |

Composition (3) Composition of Back Layer

The gelatin, matting agent, colloidal silica, surface active agent, gelatin hardening agent and viscosity increasing agent were each the same as those described in Composition (2) for the protective layer.

Dye: Mixture (1:1:1 molar ratio) of Dyes (I), (II) and (III).

Dye (I)

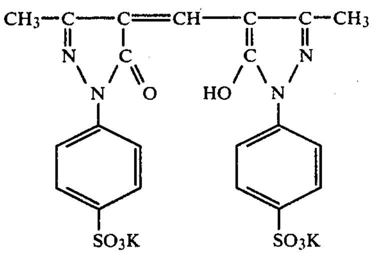

Dye (II)

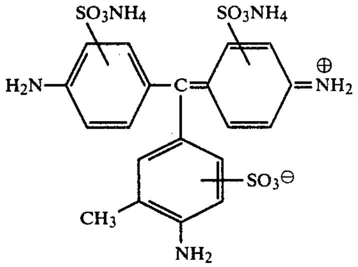

Dye (III)

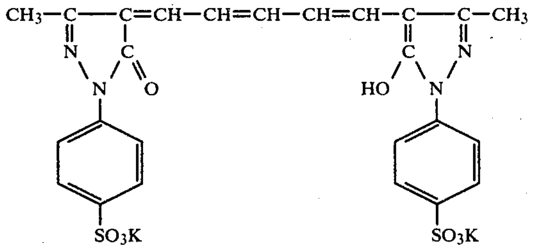

TABLE 2

| Composition of Back Layer | Sample (1) (control) | Sample (2) | Sample (3) Back Upper Layer | Sample (3) Back Lower Layer |
|---|---|---|---|---|
| Matting Agent | ← 0.03 g/$m^2$ → | | | Absent |
| Polymer Latex*1 | 50 g/100 g gelatin | | Absent | 50 g/100 g gelatin |
| Colloidal Silica | Absent | | 50 g/100 g gelatin | Absent |
| Gelatin | 5 g/$m^2$ | | 1 g/$m^2$ | 4 g/$m^2$ |
| Surface Active Agent | 40 mg/$m^2$ | | 8 mg/$m^2$ | 32 mg/$m^2$ |
| Gelatin Hardening Agent | 60 mg/$m^2$ | | 12 mg/$m^2$ | 48 mg/$m^2$ |
| Viscosity Increasing Agent | 100 mg/$m^2$ | | 20 mg/$m^2$ | 80 mg/$m^2$ |
| Dye | 0.3 g/$m^2$ | | Absent | 0.3 g/$m^2$ |

*1 Polyethyl acrylate latex (The same as that described in Example 3 of U.S. Pat. No. 3,525,620). The same as that used in the silver halide emulsion layer [Composition (1)].

The transparency after processing, the antiadhesive property and the dimensional stability of Samples (1), (2) and (3) were measured and the results shown in Table 3 below were obtained.

TABLE 3

Results of Measurement of Transparency Antiadhesive Property and Dimensional Stability

| | Sample (1) | Sample (2) | Sample (3) |
|---|---|---|---|
| Haze Value (%) | 9.2 | 9.0 | 7.4 |
| Antiadhesive Property | D | B | A |
| Dimensional Change (μ) | 90 | 90 | 92 |

It can be understood from the results in Table 3 that the antiadhesive property was markedly improved in Samples (2) and (3) wherein at least one outside layer comprised two layers, the top layer of which contained a matting agent and colloidal silica and the lower layer of which (nearer the support) of which contained the polymer latex, as compared to the control, Sample (1). Further, in Samples (2) and (3) wherein the top layer contained the matting agent and the colloidal silica and the lower layer contained the polymer latex, the transparency was improved as compared to the control, Sample (1) and the dimensional stability was not reduced.

EXAMPLE 2

A silver halide emulsion layer as described in Example 1 and a surface protective layer having the same composition as Composition (1) in Example 1 were provided on one surface of a polyethylene terephthalate film (thickness: 100μ) having a subbing layer thereon, and a gelatin back layer having the following Composition (4) was applied to the opposite surface thereof in a dry thickness of 5μ according to the combination shown in Table 4 to produce Samples (11) to (15).

Composition (4) Composition of Back Layer

The gelatin, polyethyl acrylate latex, surface active agent, gelatin hardening agent, viscosity increasing agent, matting agent, colloidal silica and dyes were each the same as those described for the back layer of Example 1.

TABLE 4

| | Composition of Back Layer | | | | | | |
|---|---|---|---|---|---|---|---|
| | | | | Sample (14) | | Sample (15) | |
| | Sample (11) control | Sample (12) | Sample (13) | Back Upper Layer | Back Lower Layer | Back Upper Layer | Back Lower Layer |
| Gelatin | ← | ←5 $g/m^2$→ | → | 1 $g/m^2$ | 4 $g/m^2$ | 1 $g/m^2$ | 4 $g/m^2$ |
| Matting Agent | ← | ←0.03 $g/m^2$→ | → | 0.03 $g/m^2$ | Absent | 0.03 $g/m^2$ | Absent |
| Polymer Latex | 50 g/100 g gelatin | Absent | 50 g/100 g gelatin | Absent | 50 g/100 g gelatin | 50 g/100 g gelatin | Absent |
| Colloidal Silica | Absent | 50 g/100 g gelatin | | 50 g/100 g gelatin | Absent | Absent | 50 g/100 g gelatin |
| Surface Active Agent, Gelatin Hardening Agent, Viscosity Increasing Agent, Dye | These were the same as those for the backing layer of Sample (1) of Example 1. | | | These were the same as those of the backing layer of Sample (3) of Example 1. | | | |

The transparency after processing, the antiadhesive property and the dimensional stability of Samples (11) to (15) were measured and results shown in Table 5 below were obtained.

TABLE 5

| | Result of Measurement of Transparency, Antiadhesive Property and Dimensional Stability | | | | |
|---|---|---|---|---|---|
| | Sample (11) | Sample (12) | Sample (13) | Sample (14) | Sample (15) |
| Haze Value (%) | 9.2 | 9.4 | 9.3 | 7.4 | 7.4 |
| Antiadhesive Property | D | A | A | A | D |
| Dimensional Change (μ) | 90 | 154 | 95 | 80 | 98 |

It can be understood from the results in Table 5 that the antiadhesive property is markedly improved in Sample (14) having two back layers wherein the back upper layer contains the matting agent and the colloidal silica and the back lower layer contains the polymer latex, as compared to the control, Sample (11), inspite of using the same amount of the matting agent as in the control sample, and that the transparency and the dimensional stability are improved too.

EXAMPLE 3

A silver halide emulsion layer as described in Example 1 and a surface protective layer having the same composition as Composition (1) in Example 1 were provided on the surface of a polyethylene terephthalate film (thickness: 100μ) having a subbing layer thereon, and a gelatin back layer having the following Composition (5) was coated on the opposite surface of the support in a dry thickness of 5μ according to the combinations shown in Tables 6 and 7 below to produce Samples (21)–(25).

Composition (5) Composition of Back Layer

The gelatin, polyethyl acrylate latex, surface active agent, viscosity increasing agent, matting agent, colloidal silica and dyes were each the same as those described for the back layer of Example 1.

TABLE 6

| | Composition of Back Lower Layer | | | | |
|---|---|---|---|---|---|
| | Sample (21) | Sample (22) | Sample (23) | Sample (24) | Sample (25) |
| Gelatin | 4 $g/m^2$ | 3 $g/m^2$ | 2.5 $g/m^2$ | 2 $g/m^2$ | 1 $g/m^2$ |
| Polymer Latex | ← | ← | ←50 g/100 g gelatin→ | | → |
| Surface Active Agent | 32 $mg/m^2$ | 24 $mg/m^2$ | 20 $mg/m^2$ | 16 $mg/m^2$ | 8 $mg/m^2$ |
| Dye | ← | ← | ←0.3 $g/m^2$→ | → | → |
| Gelatin Hardening Agent*2 | 60 $mg/m^2$ | 45 $mg/m^2$ | 37.5 $mg/m^2$ | 30 $mg/m^2$ | 15 $mg/m^2$ |
| Viscosity Increasing Agent | 80 $mg/m^2$ | 60 $mg/m^2$ | 50 $mg/m^2$ | 40 $mg/m^2$ | 20 $mg/m^2$ |

*2Gelatin Hardening Agent: 1,3-bisvinylsulfonyl-2-hydroxypropane

TABLE 7

| | Composition of Back Lower Layer | | | | |
|---|---|---|---|---|---|
| | Sample (21) | Sample (22) | Sample (23) | Sample (24) | Sample (25) |
| Gelatin | 1 $g/m^2$ | 2 $g/m^2$ | 2.5 $g/m^2$ | 3 $g/m^2$ | 4 $g/m^2$ |
| Colloidal Silica | ← | ← | ←50 g/100 g gelatin→ | | → |
| Surface Active Agent | 8 $mg/m^2$ | 16 $mg/m^2$ | 20 $mg/m^2$ | 24 $mg/m^2$ | 32 $mg/m^2$ |
| Gelatin Hardening Agent*2 | 15 $mg/m^2$ | 30 $mg/m^2$ | 37.5 $mg/m^2$ | 45 $mg/m^2$ | 60 $mg/m^2$ |
| Viscosity Increasing Agent | 20 $mg/m^2$ | 40 $mg/m^2$ | 50 $mg/m^2$ | 60 $mg/m^2$ | 80 $mg/m^2$ |
| Matting Agent | ← | ← | ←0.03 $g/m^2$→ | → | → |

*2Gelatin Hardening Agent: 1,3-bisvinylsulfonyl-2-hydroxypropane

The transparency after processing, the antiadhesive property and the dimensional stability of the resulting Samples (21)–(25) were measured and the results shown in Table 8 below were obtained.

TABLE 8

| Result of Measurement of Transparency, Antiadhesive Property and Dimensional Stability | Sample (21) | Sample (22) | Sample (23) | Sample (24) | Sample (25) |
|---|---|---|---|---|---|
| Haze Value (%) | 7.4 | 7.7 | 7.9 | 8.3 | 8.0 |
| Antiadhesive Property | A-B | A | A | A | A |
| Dimensional Change (μ) | 80 | 85 | 92 | 94 | 98 |

It can be understood from the results in Table 8 above that, in the samples having a multilayer back layer wherein the back upper layer contained the matting agent and the colloidal silica and the back lower layer contained the polymer latex, the transparency improves as the film thickness of the back upper layer decreases inspite of using the same amount of the matting agent, and the dimensional stability is excellent too. Further, it can be understood that, if the thickness of the back upper layer is too thin, the antiadhesive property deteriorates 1 grade or so.

EXAMPLE 4

A silver halide emulsion layer as described in Example 1 and a surface protective layer having the same composition as Composition (1) in Example 1 were provided on one surface of a polyethylene terephthalate film (thickness: 100μ) having a subbing layer thereon, and a gelatin back layer having the following Composition (6) was coated on the opposite surface thereof in a dry thickness of 5μ to produce Samples (31)-(35).

Composition (6) Composition of Back Layer (6-1) Composition of Back Lower Layer

| | | |
|---|---|---|
| Gelatin | 4 g/m$^2$ | These are common in Samples (31)-(35) |
| Polyethyl Acrylate Latex | 50 g/100 g gelatin | |
| Surface Active Agent | 32 mg/m$^2$ | |
| Dye | 0.3 g/m$^2$ | |
| Gelatin Hardening Agent | 48 gm/m$^2$ | |
| Viscosity Increasing Agent | 80 mg/m$^2$ | |

These components were the same as those described in Example 1.

(6-2) Composition of Back Upper Layer

| | | |
|---|---|---|
| Gelatin | 1 g/m$^2$ | These are common in Samples (31)-(35) |
| Matting Agent | 0.03 g/m$^2$ | |
| Surface Active Agent | 8 mg/m$^2$ | |
| Gelatin Hardening Agent | 12 mg/m$^2$ | |
| Viscosity Increasing Agent | 20 mg/m$^2$ | |

These components were the same as those described in Example 1.

Colloidal Silica 50 g/100 g gelatin

Sample (31): Snowtex-O, the pH of which was adjusted to 9.5 with potassium hydroxide.

Sample (32): Snowtex-N

Sample (33): Snowtex-20

Sample (34): Snowtex-C

Sample (35): Ludox LS

The transparency after processing, the antiadhesive property and the dimensional stability of Samples (31)-(35) were measured and the results shown in Table 9 below were obtained.

TABLE 9

| Results of Measurement of Transparency, Antiadhesive Property and Dimensional Stability | Sample (31) | Sample (32) | Sample (33) | Sample (34) | Sample (35) |
|---|---|---|---|---|---|
| Haze Value (%) | 7.4 | 7.5 | 7.3 | 7.5 | 7.5 |
| Antiadhesive Property | A | A | B-C | B-C | B-C |
| Dimensional Change (μ) | 80 | 80 | 80 | 80 | 80 |

It can be understood from the results in Table 9 that, in the samples having two back layers wherein the back upper layer contained the matting agent and the colloidal silica and the back lower layer contained the gelatin and the polymer latex, although the antiadhesive property changes depending on the colloidal silica used, the dimensional stability and the transparency do not change. It can be understood that the antiadhesive property and the dimensional stability are excellent in Sample (31) containing Snowtex-O, the pH of which was adjusted to 9.5 using potassium hydroxide and Sample (32) containing Snowtex N.

While the invention has been described in detail and with reference to specific embodiment thereof, it will be apparent to one skilled in the art that various changes and modifications can be made therein without departing from the spirit and scope thereof.

What is claimed is:

1. A silver halide photographic light-sensitive element exhibiting good transparency after development comprising at least one silver halide emulsion layer on a support and two or more hydrophilic colloid layers on at least one side of said support, wherein (i) a hydrophilic colloid layer positioned farther from the support contains gelatin, a matting agent having an average particle size of 1 to 5μ and colloidal silica having an average particle size less than that of the matting agent and (ii) a hydrophilic colloid layer which is positioned nearer the support than the position of hydrophilic colloid layer (i) consists essentially of gelatin and a polymer latex comprising an aqueous dispersion of a water-insoluble polymer wherein the polymer has an average particle size of about 20 mμ to about 200 mμ, said matting agent being present in an amount effective to decrease the adhesion of the hydrophilic colloid layer in which it is present, said collidal silica being present in an amount effective to improve the antiadhesive property of the hydrophilic layer in which it is present and said polymer latex being present in an amount effective to improve dimensional stability, gelatin present in the element layers serving as a hydrophilic binder.

2. The silver halide photographic light-sensitive element of claim 1, wherein said element contains two hydrophilic colloid layers on the back surface of the support and in which the hydrophilic colloid layer (i) farther from the support contains said gelatin, said matting agent and said colloidal silica and the hydrophilic colloid layer (ii) nearer the support contains said gelatin and said polymer latex.

3. The silver halide photographic light-sensitive element of claim 2, wherein the matting agent is present in an amount of about 0.1 to about 5% by weight based on the dry weight of the gelatin in both of said hydrophilic colloid layers.

4. The silver halide photographic light-sensitive element of claim 2, wherein the colloidal silica is present in an amount of about 5 to about 100% by weight based on the dry weight of the gelatin in the hydrophilic colloid layer (i).

5. The silver halide photographic light-sensitive element of claim 2, wherein the hydrophilic colloid layer (i) has a thickness of about 0.1 to 3μ and the two hydrophilic colloid layers (i) and (ii) have a total thickness of about 1 to about 10μ.

6. The silver halide photographic light-sensitive element of claim 2, wherein the amount of the polymer latex present is an amount of about 1 to about 100% by weight based on the dry weight of the gelatin of the hydrophilic colloid layer (ii).

7. The silver halide photographic light-sensitive element of claim 1, wherein the hydrophilic colloid layer (i) is a surface protective layer and contains said gelatin, said matting agent and said colloidal silica and said hydrophilic colloid layer (ii) is a silver halide emulsion layer and contains said gelatin and said polymer latex.

8. The silver halide photographic light-sensitive element of claim 1, comprising a silver halide emulsion layer and a surface protective layer on one side of the support and on the opposite side of the support a back upper layer farther from the support and a back lower layer nearer the support, with the surface protective layer and the back upper layer each containing said gelatin, said matting agent and said colloidal silica, and with the silver halide emulsion layer and the back lower layer each containing said gelatin and said polymer latex.

9. The silver halide photographic light-sensitive element of claim 8, wherein the back upper layer and/or the surface protective layer additionally contains a viscosity increasing agent having therein a repeating unit represented by the following general formula

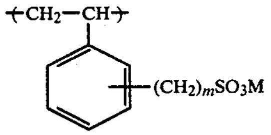

wherein m is 0, 1 or 2 and M is an alkali metal atom or an ammonium group.

10. The silver halide photographic light-sensitive element of claim 1, wherein the matting agent is present in an amount of about 0.1 to about 5% by weight, the colloidal silica is present in an amount of about 5 to about 100% by weight, and the polymer latex is present in an amount of about 1 to about 100% by weight, based on the dry weight of the gelatin in the hydrophilic colloid layer in which they are present, further wherein the colloidal silica has an average particle size of 7 mμ to 120 mμ.

11. The silver halide photographic light-sensitive element of claim 10, wherein the amount of gelatin in the hydrophilic colloid layer positioned further away from the support is about 0.1 to about 3 $g/m^2$ and wherein the amount of gelatin in other hydrophilic colloid layers is about 1 to about 7 $g/m^2$.

12. The silver halide photographic light-sensitive element of claim 11, wherein the polymer of the polymer latex has an average molecular weight of above about 100,000 and comprises monomer units selected from the group consisting of alkyl esters, hydroxyalkyl esters or glycidyl esters of acrylic acid, alkyl esters, hydroxyalkyl esters or glycidyl esters of methacrylic acid.

13. The silver halide photographic light-sensitive element of claim 12, wherein the hydrophilic colloid layer (i) is an outermost layer in the element.

14. The silver halide photographic light-sensitive element of claim 13, wherein said outermost layer is a surface protective layer or a backing layer.

15. The silver halide photographic light-sensitive element of claim 12, wherein the hydrophilic colloid layer (i) is a surface protective layer which is on the silver halide emulsion layer side of the support.

16. The silver halide photographic light-sensitive element of claim 12, wherein the hydrophilic colloid layers (i) and (ii) are on the side of the element opposite the silver halide emulsion layer.

17. The silver halide photographic light-sensitive element of claim 16, wherein the hydrophilic colloid layer (i) has a thickness of about 0.1 to 3μ and the two hydrophilic colloid layers (i) and (ii) have a total thickness of about 1 to about 10μ.

* * * * *